Figure 1:
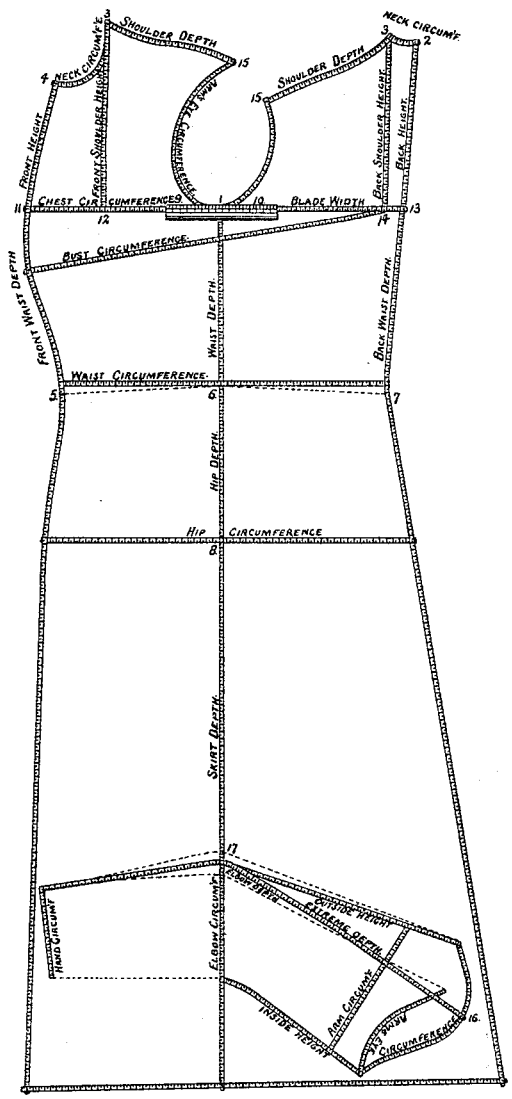

(No Model.) 2 Sheets—Sheet 1.

D. C. CHRISTNER.
METHOD OF OBTAINING THE MEASUREMENT OF THE HUMAN FORM.

No. 389,287. Patented Sept. 11, 1888.

WITNESSES:

INVENTOR (No Model.) 2 Sheets—Sheet 2.
D. C. CHRISTNER.
METHOD OF OBTAINING THE MEASUREMENT OF THE HUMAN FORM.
No. 389,287. Patented Sept. 11, 1888.
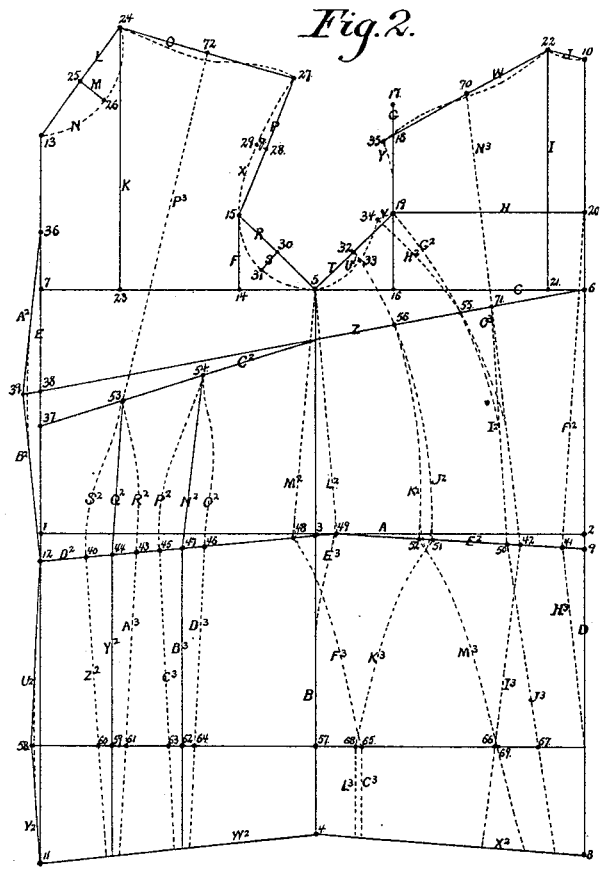
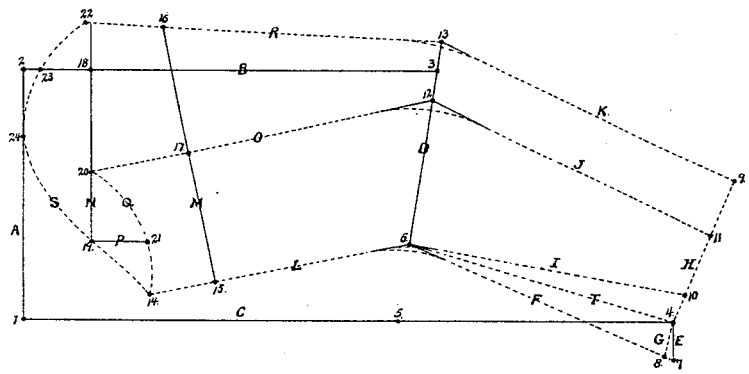

UNITED STATES PATENT OFFICE.

DAVID C. CHRISTNER, OF PHILADELPHIA, PENNSYLVANIA, ASSIGNOR TO LIBBIE J. CHRISTNER, OF SAME PLACE.

METHOD OF OBTAINING THE MEASUREMENT OF THE HUMAN FORM.

SPECIFICATION forming part of Letters Patent No. 389,287, dated September 11, 1888.

Application filed May 19, 1887. Serial No. 238,794. (No model.)

*To all whom it may concern:*

Be it known that I, DAVID C. CHRISTNER, of the city of Philadelphia, and State of Pennsylvania, have invented a certain new and useful Improvement in the Method of Obtaining the Measurement of the Human Form; and I do hereby declare the following to be a full, clear, and exact description thereof, reference being had to the accompanying drawings, forming part of this specification.

The object of my invention is to produce a system of measuring the human form, whereby a perfect-fitting garment is obtained without trying on, fitting, or altering.

My invention consists in an improved system of measuring the human form by a certain defined formula or method, as hereinafter described, which is in turn reproduced in the material to be worked into the garment with mathematical accuracy, so that the garment, without previous fitting, will, when put on for the first time, form a perfect fit.

In the accompanying drawings, Figure 1 represents and illustrates the various measurements of my system and the respective points and parts of the human form from which and over which the said measurements are taken. Fig. 2 represents my pattern-form, showing the measurements as laid out thereon, as taken by my system from the human form, in combination with the given points herein described, the dotted lines representing the pattern-lines.

I will now describe my invention, so that others skilled in the art to which it appertains will be enabled to make and use the same, reference being had to the accompanying drawings, and to the letters and figures marked thereon.

Supposing the form shown in Fig. 1 to be the human form to be fitted, proceed as follows:

First. Locate point 1 on the garment of the form to be measured on the exact center point underneath the arm on the junction-line of the arm and the body, and as illustrated in its correct position. Repeat point 1 in like manner on the opposite side of the form by the instructions for fixing its location on the first side, and as the same is illustrated in its first position.

Second. With the tape-measure carefully and accurately take the exact circumference measure around the bare neck on the junction-line of the neck and the body, or, in other words, on the line of the proper junction of the collar with the high and close-fitting garment, reading it and placing or having it placed in the measure-book.

Third. Adjust the collar of the garment worn by the form being measured closely and securely around the junction of the neck and the body by fastening it with a pin at the front, turning it up, if not an upright collar. Then locate point 2 on the garment of the form being measured on the exact center point at the back of the form and at the neck on the junction-line of the neck and the body, or, in other words, on the exact center of the proper junction-line of the collar with the high and close-fitting garment at the back of the form, and as the same is illustrated in its correct position.

Fourth. Mentally find one-eighth of the neck circumference, which has already been taken. Then locate point 3 on the garment of the form being measured at the side of the neck and on the junction-line of the neck and the body, or on the proper junction-line of the collar with the high and close-fitting garment at the distance of one-eighth of the neck circumference from point 2 toward the front of the form, and as the same is illustrated in its correct position. Repeat point 3 in like manner and give it the like position at the opposite side of the form by the instructions for fixing its location at the first side, and as the same is illustrated in its first and proper position. The distances from point 2 to point 3 on the right side and from point 2 to point 3 on the left side must be exactly one-eighth of the neck circumference, and the distance from point 3 on the right side over point 2 to point 3 on the left side must exactly equal one-fourth of the neck circumference.

Fifth. Locate point 4 on the garment of the form being measured on the exact center point at the front of the form at the neck and on the junction-line of the neck and the body, or, in other words, on the exact center of the proper junction-line of the collar with the high and close-fitting garment at the front of the form, and as the same is illustrated in its correct position.

Sixth. Locate point 5 on the garment of the form being measured on the center point at the front of the form and at the waist on the horizontal line with the actual depth of the waist at the front, and as the same is illustrated in its correct position.

Seventh. Locate point 6 on the garment of the form being measured on the exact center point at the side of the form on the horizontal line with the actual depth of the waist at the side, and as the same is illustrated in its correct position. Repeat point 6 in like manner and give it the like position at the opposite side of the form by the instructions for fixing its location at the first side, and as the same is illustrated in its first and proper position.

Eighth. Locate point 7 on the garment of the form being measured on the exact center point at the back of the form on the horizontal line with the actual depth of the waist at the back, and as the same is illustrated in its correct position.

Ninth. Locate point 8 on the garment of the form being measured on the exact center point at the side of the form on the horizontal line with the actual depth of the most prominent part of the hips at the side, and as the same is illustrated in its correct position. Repeat point 8 in like manner and give it the like position at the opposite side of the form, per instructions for fixing its first and proper location at the first side, and as the same is illustrated in its first and proper position.

Tenth. Place the form of the person being measured in an easy, natural, and standing position, having the side toward your front and the arms down at the side of the form in their natural hanging position, and place the square or inch-rule close up underneath and firmly against the junction of the under side of the upper part of the arm and body, and having said part of the square or otherwise the straight inch-rule in a horizontal position with the form. Then locate point 9 as follows, viz: Locate point 9 on the garment of the form being measured immediately in front of the arm and even with the top of the inch-rule, and as the same is illustrated in its correct position. Before changing the position of the inch-rule, locate point 10 immediately back of the arm and even with the top of the inch-rule, and as the same is illustrated in its correct position. Then reverse or change the position of the form being measured, so as to have the opposite side toward your front. Repeat points 9 and 10 in like manner and give them like positions, respectively, at the opposite side of the form, per instructions for fixing their first and proper positions, and as the same is illustrated in their first position.

Eleventh. Place the inch-rule in a horizontal position across the chest at the front of the form, having the top edge exactly even with point 9 on the right side and also even with point 9 on the left side. Then locate point 11 on the garment of the form being measured on the exact center point at the front of the form on a line with or even with the upper edge of the inch-rule, and as the same is illustrated in its correct position. Then locate point 12 on the garment of the form being measured on a line even with the upper edge of the inch-rule and at a point which is the distance of one-fourth of the neck circumference from point 11 toward point 9 on the right side at the front of the form, and as the same is illustrated in its correct position. Before changing the position of the inch-rule, repeat point 12 on the garment of the form being measured on the same line at the upper edge of the inch-rule and the same distance or one-fourth of the neck circumference from point 11 toward point 9 on the left or opposite side at the front of the form, and as point 12 is illustrated in its first and correct position.

Twelfth. Place the inch-rule in a horizontal position across the chest at the back of the form being measured, having the top edge exactly even with point 10 on the right side, and also even with point 10 on the left side. Then locate point 13 on the garment of the form being measured on the exact center point at the back of the form on a line with or even with the upper edge of the inch-rule, and as the same is illustrated in its correct position. Then locate point 14 on the garment of the form being measured on a line even with the upper edge of the inch-rule and at a point which is the distance of one-eighth of the neck circumference from point 13 toward point 10 on the right side at the back of the form, and as the same is illustrated in its correct position. Before changing the position of the inch-rule, repeat point 14 on the garment of the form being measured on the same line or at the upper edge of the inch-rule and same distance or one-eighth of the neck-circumference from point 13 toward point 10 on the left side at the back of the form, and as point 14 is illustrated in its first and correct position.

Thirteenth. Locate point 15 on the garment of the form being measured at a point which is the distance of the actual or desired shoulder depth from point 3 toward the shoulder-point at the side of the form and one and one-half inch from the top center of the shoulder-point toward the back of the form, and as the same is illustrated in its correct position.

Fourteenth. Now having located all the necessary points carefully and accurately, take the following respective measures over the following respective given lines and distances and in the following order, viz:

*a. Skirt depth.*—Measure closely on a perpendicular line with the stretched tape-measure over the form from point 6 toward the bottom to the actual or desired depth of the skirt, as correctly illustrated.

*b. Blade width.*—Measure closely on a horizontal line with the stretched tape-measure over the back of the form from point 1 on the left side to point 1 on the right side, and as the same is correctly illustrated on the first side.

*c. Chest circumference.*—Measure with a comfortable degree of closeness on a circumference-line of the stretched tape-measure around the chest of the form on a horizontal line with the junction of the under side of the upper part of the arm and the body, and as the same is correctly illustrated on the first side.

*d. Waist depth.*—Measure on a perpendicular line of the stretched tape-measure over the form from point 1 to point 6, and as the same is correctly illustrated.

*e. Back-waist depth.*—Measure on a perpendicular line of the stretched tape-measure over the form from point 13 to point 7, and as the same is correctly illustrated.

*f. Back height.*—Measure on a perpendicular line of the stretched tape-measure over the form from point 2 to point 13, and as the same is correctly illustrated.

*g. Front-waist depth.*—Measure on a perpendicular line of the stretched tape-measure over the form from point 11 to point 5, and as the same is correctly illustrated.

*h. Front height.*—Measure on a perpendicular line of the stretched tape-measure over the form from point 4 to point 11, and as the same is correctly illustrated.

*i. Arm's-eye circumference.*—Measure on a circumference line of the stretched tape-measure around the junction of the upper part of the arm and body over the shoulder and very closely, and as the same is correctly illustrated.

*j. Back-shoulder height.*—Measure closely on a perpendicular line of the stretched tape-measure over the form from point 3 to point 14, and as the same is correctly illustrated. Prove the correctness of your measure of the back-shoulder height and front-shoulder height by observing whether the sum of the two equals or "balances" the entire distance from point 12 at the front over point 3 at the side of the neck down to point 14 at the back.

*k. Front-shoulder height.*—Measure closely on a perpendicular line of the stretched tape-measure over the form from point 3 to point 12, and as the same is correctly illustrated.

*l. Shoulder depth.*—Measure on a line of the stretched tape-measure held upon and over the form from point 3 to point 15, and as the same is correctly illustrated.

*m. Bust circumference.*—Measure with a degree of closeness representing both elegance of fit and an easy comfort on a diagonal circumference-line of the stretched tape-measure around the fullest part of the form at the front and over point 13 at the back, and as the same is correctly illustrated.

*n. Waist circumference.*—Measure very closely on a horizontal circumference-line of the stretched tape-measure around the form at the lower terminus of the natural waist, and as the same is correctly illustrated.

*o. Hip depth.*—Measure on a line of the stretched tape-measure held upon and over the form from point 6 to point 8, and as the same is correctly illustrated.

*p. Hip circumference.*—Measure with a degree of closeness representing both elegance of fit and a very easy comfort on a horizontal circumference-line of the stretched tape-measure around the fullest part of the form below the waist circumference at the position of point 8 on the garment, and as the same is correctly illustrated.

This completes the body measurements.

To obtain the various sleeve measurements proceed as follows: Having the upper part of the arm down along and in a line with the body, in an easy and natural position, and the lower part of the arm in a horizontal position with the body and at the front, carefully and accurately take the following respective measures over the respective given lines and distances in the following order, viz:

*a. Extreme depth.*—Locate point 16 on the top of the shoulder of the garment of the form being measured at a point on the line of the junction of the upper and top part of the arm with that of the shoulder, or, in other words, at the point on the true arm's-eye circumference, which is one inch toward the front of the form from point 15, and as the same is illustrated in its proper position. Then measure from point 16 on a direct line of the stretched tape-measure around and over the outside point of the bone of the elbow and along the outside of the arm to the most prominent bone at the outside of the wrist, and as the same is illustrated in its proper position.

*b. Arm's-eye circumference.*—This is one and the same measure with that given in the measures and instructions for the "body-measures," and the same measure being used, it need not therefore be retaken; and if taken for sleeve-cutting only, it is taken per instructions for the same measure under the head of taking measures for "body-drafting," and as the same is illustrated in its correct position.

*c. Elbow circumference.*—Measure on a diagonal circumference-line of the stretched tape-measure around the arm at the point of the deepest depression on the inside of the arm at the elbow and over the extreme point of the bone at the outside of the elbow to the degree of closeness desired, and as the same is illustrated in its correct position.

*d. Elbow depth.*—Locate point 17 on the sleeve of the form at a point which is on the center of the outside point of the outside bone of the elbow. Then measure on a line of the stretched tape-measure from point 16 to point 17, and as the same is illustrated in its correct position.

*e. Hand circumference.*—Measure on a circumference-line of the stretched tape-measure around the fullest part of the hand over the junction of the thumb with the hand to the degree of closeness desired, and as the same is illustrated in its correct position.

*f. Inside height.*—Measure on a line of the stretched tape-measure pressed and held firmly on the point of the deepest depression at the inside of the elbow at the inside of the arm, up along the proper position for the inside seam of the sleeve, close up to the junction of the front inside of the upper part of the arm with that of the body, and as the same is illustrated in its correct position.

*g. Arm circumference.*—Measure on a circumference-line of the stretched tape-measure around the arm at the point which is one-fourth of the inside height from the junction of the lower part of the arm with that of the body toward the elbow to the degree of closeness desired, and as the same is illustrated in its correct position.

*h. Outside height.*—Measure on a line of the stretched tape-measure from point 17 to the point on the true arm's-eye circumference which is equidistant from point 1 and point 15 at the back of the arm, or, in other words, at the proper point on the correct arm's-eye circumference where the seam at the back of the sleeve joins with the garment of the form, and as the same is illustrated in its correct position.

The measurements thus obtained are to be applied to the material to be made up by means of a pattern or chart upon which the said measurements are first properly drafted, or they may be laid off upon the material direct.

In taking the measurements from the form by my system, as well as in laying down or drafting the same upon the material for the production of the pattern, I employ an inch-rule and tape-measure alone, doing away with the necessity of using instruments and appliances in the form of scales, squares, circles, charts, machines, &c., commonly employed for drafting garments.

I am aware that prior to my invention tailors and dress-makers have used body-measures which I have herein designated, the "neck-circumference measure," the "bust-circumference measure," the "hip-circumference measure," the "arm's-eye circumference measure," the "waist-depth measure," the "shoulder-depth measure," and the "skirt-depth measure," and in sleeve-measures have used the measures which I have herein designated as the "arm-circumference measure," "elbow-circumference measure," "hand-circumference measure," "extreme-depth measure," and "elbow-depth measure;" but cut from a pattern drafted from these measurements alone a garment is ill fitting and requires alteration. The measurements so taken are incomplete and much is left to guesswork; but such measures, when combined with certain other body and sleeve measures, which I have herein designated as the "blade-width measure," the "back-waist measure," the "front-waist-depth measure," the "front-height measure," the "front-shoulder-height measure," the "back-height measure," and the "back-shoulder-height measure," and certain other sleeve-measures, which I have herein designated as the "inside-height measure" and the "outside-height measure," which said body and sleeve measures, so far as I am aware, are entirely new and original, and were never known or used until I invented or discovered the same. The whole in combination form a perfect and complete system of measuring the human form mathematically exact, cut according to which system a garment is perfect in its fit and needs no alteration or trying on.

Having thus described my invention, what I claim and what I desire to secure by Letters Patent is—

1. The system or method of measuring the human form, consisting in taking the various body measurements by locating a point in the form to be measured at the center point underneath the arm on the junction-line of the arm and body, repeating it in like manner on the opposite side of the form, taking the exact circumference of the bare neck on the junction-line of the neck and body, locating a point as indicated at point 2, locating a point as indicated at point 3, repeating point 3 on opposite side, locating point as indicated at point 4, locating point as indicated by point 5, locating point as indicated at point 6, repeating point 6 in like manner on opposite side, locating point as indicated at point 7, locating point as indicated at point 8, repeating point 8 on opposite side, locating point as indicated at point 9, locating point as indicated at point 10, repeating points 9 and 10 on opposite side, locating point as indicated at point 11, locating point as indicated at point 12, locating point as indicated at point 13, locating point as indicated at point 14, repeating point 14 in like manner on the opposite side, locating point as indicated at point 15 and repeating point 15 in like manner on opposite side, measuring from point 6 toward the bottom to the desired depth of the skirt, measuring over the back of the form from point 1 to point 1 on the opposite side, measuring on a horizontal circumference-line around the entire form underneath the upper part of the arms over point 1 at each side, measuring from point 1 to point 6 on each side, measuring from point 13 to point 7, measuring from point 2 to point 13, measuring from point 11 to point 5, measuring from point 4 to point 11, measuring on a circumference-line around the junction of the upper part of the arm and body over the shoulders, measuring from point 3 to point 14 on each side, measuring from point 3 to point 12, measuring from point 3 to point 15, measuring on a diagonal circumference-line around the fullest part of the form at the front and over point 13 at the back, measuring closely on horizontal circumference-line around the form at the lower terminus of the natural waist, measuring from point 6 to point 8 on each side, measuring with a degree of easy comfort on a horizontal circumference-line around the fullest part of the form below the waist circumference about the position of point 8, all substantially in the manner and for the purposes hereinbefore set forth and described.

2. The system or method of measuring the arm of the human form for sleeve-fitting, consisting in locating a point on the top of the shoulder of the form being measured, as at point 16, measuring from point 16 around and over the outside point of the bone of the elbow and along the outside of the arm to the most prominent bone at the outside of the wrist, measuring on a circumference-line around the junction of the upper part of the arm and body, over the shoulder and closely, measuring around the arm at the point of deepest depression on the inside of the arm at the elbow and over the point of bone at the outside of the elbow to the degree of closeness desired, locating point 17 at a point which is on the center of the outside point of the outside bone of the elbow, measuring on a line from point 16 to point 17, measuring on a circumference-line around the fullest part of the hand over the junction of the thumb with the hand to the degree of closeness desired, measuring from the point of the deepest depression at inside of the elbow on the inside of the arm close up to the junction of the front inside of the upper part of the arm with the body, measuring a circumference-line around the arm a short distance from junction of the arm with the body, measuring from point 17 to a point on the true arm's-eye circumference, all substantially in the manner and for the purposes hereinbefore set forth and described.

3. The system of measuring the human form, consisting in taking the various measurements of the form from and between certain points located on a horizontal circumference-line passing around said form underneath and touching the junction of the under part of the arm of and with said form to points located on the natural junction and circumference line of the neck of said form or on the proper circumference or junction line of the collar with the garment, and from the herein-described points of intersection of said horizontal body-circumference line with and over the line along the center of the back to the terminus of the proper waist depth at the center of the back, and with and over the line along the center of the front to the terminus of the proper waist depth at the center of the front of said form, and between the center point on the most prominent bone at the outside of the elbow of the arm on the direct line along the outside of the arm on the desired and proper outside seam of the sleeve and the point of intersection of said line and seam with the natural junction of the arm and body or with the proper arm's-eye circumference-line of the garment, and between the herein-described center point of the deepest depression or angle of the inside of the elbow of the arm, on the direct line along the inside of the arm, on the desired and proper inside seam of the sleeve, and the point of intersection of said line and seam with the natural junction of the arm and body of said form, or with the proper arm's-eye circumference-line of the garment for which said measures are taken, together with the various other body measurements and sleeve measurements, ascertained, as herein described, in the manner, by the means, and for the purposes hereinbefore substantially set forth and described.

In testimony whereof I have hereunto set my hand this 5th day of May, A. D. 1887.

DAVID C. CHRISTNER.

Witnesses:
    JNO. C. BELL,
    L. G. MYERS.